United States Patent [19]

Brulet

[11] Patent Number: 4,868,258
[45] Date of Patent: Sep. 19, 1989

[54] VINYL CHLORIDE LATEX POLYMERS WITH DITER-BUTYL-P-CRESOL AS POLYMERIZATION AID

[75] Inventor: Daniel Brulet, Saint-Symphorien D'Ozon, France

[73] Assignee: Atochem, France

[21] Appl. No.: 29,741

[22] Filed: Mar. 24, 1987

[30] Foreign Application Priority Data

Apr. 3, 1986 [FR] France ............................... 86 04763

[51] Int. Cl.$^4$ ................................................ C08F 2/26
[52] U.S. Cl. ........................................ 526/84; 526/225
[58] Field of Search ..................... 526/84, 81; 524/834

[56] References Cited

U.S. PATENT DOCUMENTS

| | | | |
|---|---|---|---|
| 2,662,867 | 12/1953 | Hoertz | 524/358 |
| 4,180,634 | 12/1979 | Koyanagi | 526/62 |
| 4,401,798 | 8/1983 | Ceprini | 526/84 |
| 4,478,986 | 10/1984 | Reid | 526/83 |
| 4,482,684 | 11/1984 | Gardner | 526/84 |
| 4,654,392 | 3/1987 | Marshall | 526/84 |

Primary Examiner—Christopher Henderson
Attorney, Agent, or Firm—Sigalos, Levine & Montgomery

[57] ABSTRACT

The improvement in a process for the preparation of latexes of homo- and co-polymers of vinyl chloride, with particles having a mean diameter between 0.2 and 0.8 μm and containing at least one organosoluble polymerization initiator, by polymerization in microsuspension of the corresponding monomer or monomers, according to which a fine dispersion of the monomer or monomers is formed in an aqueous medium containing at least one anionic emulsifying agent or at least one anionic emulsifying agent and at least one nonionic emulsifying agent, in the presence of 0.004 to 0.16% by weight; in relation to the weight of the monomer or monomers, of said initiator expressed as active oxygen and then the thus formed reaction medium is subjected to polymerization at the desired polymerization temperature ($\theta_1$); the improvement comprising adding to the aqueous medium 2,6-ditert.-butylpara-cresol prior to forming the dispersion of the monomer or monomers and during the course of the polymerization adding 2,6-ditert.-butyl-para-cresol, in continuous manner, to the reaction medium, when the temperature of the reaction medium ($\theta_2$) is such that the temperature difference $\theta_2 - \theta_1$ is above a value selected in the interval going from 0° to +5° C. and preferably from 0° to +2° C.

9 Claims, No Drawings

VINYL CHLORIDE LATEX POLYMERS WITH DITER-BUTYL-P-CRESOL AS POLYMERIZATION AID

BACKGROUND OF THE INVENTION

The object of the present invention is the preparation of latexes of homo- and co-polymers of vinyl chloride: whose particles have a mean diameteI between 0.2 and 0.8 μm and contain at least one organosoluble polymerization initiator, by the polymerization in microsuspension of the corresponding monomer or monomers. Its object likewise is the latexes resulting therefrom as well as their utilization, as seeding products, for the preparation in seeded microsuspension of homo- and co-polymers of vinyl chloride. The particles of said latexes contain all of the initiator necessary for the polymerization in seeded microsuspension and said polymerization does not require the complementary addition of polymerization initiator.

As used herein, the terms polymerization "in microsuspension" or "fine suspension" mean a polymerization in the presence of an organosoluble initiator or initiators of at least one monomer dispersed by agitation in an aqueous medium containing an emulsifying agent as a stabilizer.

French patent No. 1,485,547 shows for the preparation of vinyl chloride polymers by polymerization in seeded microsuspension, that it is known to use as seeding product a latex whose particles contain all of the initiator necessary for said polymerization.

The procedures, used until now, for the preparation of such a latex by polymerization n microsuspension present the following drawbacks:

(i) during the preparation of the dispersion of the monomer or monomers, which is carried out at a temperature generally between 10° and 30° C., almost always the formation of crusts is observed which disturb the functioning of the mechanical means employed and, on doing so, leads to a latex whose mean particle diameter is not reproducible from one operation to another, and/or (ii) durinq the polymerization of the monomer or monomers thus dispersed, the large quantity of initiator present, which can be equal to more than 20 times the quantity required for polymerization, frequently leads to sudden temperature elevations of the reaction medium, which can exceed and to the formation of large numbers of crusts.

SUMMARY OF THE INVENTION

The procedure which is the object of the invention overcomes the drawbacks stated above.

Briefly state, the present invention comprises the improvement in a process for the preparation of latexes of homo- and co-polymers of vinyl chloride, with particles having a mean diameter between 0.2 and 0.8 μm and containing at least one organosoluble polymerization initiator, by polymerization in microsuspension of the corresponding monomer or monomers, according to which a fine dispersion of the monomer or monomers is formed in an aqueous medium containing at least one anionic emulsifying agent or at least one anionic emulsifying agent and at least one nonionic emulsifying agent, in the presence of 0.004 to 0.16% by weight in relation to the weight of the monomer or monomers, of said initiator expressed as active oxygen and then the thus formed reaction medium is subjected to polymerization at the desired polymerization temperature ($\theta_1$) the improvement comprising adding to the aqueous medium 2,6-ditert.-butyl-para-cresol prior to forming the dispersion of the monomer or monomers and during the course of the polymerization adding 2,6-ditert.butyl-para-cresol, in continuous manner, to the reaction medium, when the temperature of the reaction medium ($\theta_2$) is such that the temperature difference $\theta_2 - \theta_1$ is above a value selected in the interval going from 0° to +5° C. and preferably from 0° to +20° C.

The invention also comprises the resultant products and the use of such products as the seeding product in polymerization of vinyl chloride in seeded microsuspension as hereinafter set forth.

DETAILED DESCRIPTION

According to the present invention, prior to forming the dispersion of the monomer or monomers, 2,6-ditert.-butyl-para-cresol is added to the aqueous medium, and during the course of the polymerization operation 2,6-ditert.-butyl-para-cresol is likewise added in continuous manner to the reaction medium, when the temperature of the reaction medium ($\theta_2$) is such that the temperature difference $\theta_2 - \theta_1$ is above a value selected in the interval going from 0° to +5° C.

It has been found that the addition of 2,6-ditert.-butyl-para-cresol butyl-para-cresol to the aqueous medium prior to carrying out the dispersion of the monomer or monomers suppresses the formation of crusts and that its addition during the course of the polymerization operation, under the conditions of the procedure of the invention, limits to less than 6° C. the temperature elevations and substantially reduces the formation of crusts at this stage. It has also been observed that the use, under the same conditions, of hydroquinone or of methylhydroquinone in place of 2,6-ditert.-butyl-para-cresol only very slightly reduces the drawbacks stated above.

The 2,6-ditert.-butyl-para-cresol added to the aqueous medium prior to carrying out the dispersion of the monomer or monomers generally represents from about 0.0005 to 0.05% by weight in relation to the monomer or monomers.

The 2,6-ditert.-butyl-para-cresol added to the reaction medium during the course of the polymerization operation generally represents from about 0.0005 to 0.05% by weight in relation to the monomer or monomers and is preferably employed in the form of an aqueous dispersion or in solution in a low-molecular-weight aliphatic alcohol such as, for instance, methyl alcohol or ethyl alcohol. The 2,6-ditert.-butyl-para-cresol butyl-para-cresol content of said aqueous dispersion is generally from about 0.01 to 1% by weight. The 2,6-ditert.-butyl-para-cresol content of said solution is generally from about 5 to 15% by weight.

As used herein vinyl chloride "polymers" mean the homo- and co-polymers of vinyl chloride; the latter containing at least 50by weight of vinyl chloride and at least one monomer copolymerizable with vinyl chloride. The copolymerizable monomers are those generally employed in the standard techniques of copolymerization of vinyl chloride. Examples are the vinyl esters of mono- and polycarboxylic acids, such as vinyl acetate, propionate, benzoate; the unsaturated mono- and polycarboxylic acids such as acrylic, methacrylic, maleic, fumaric and itaconic acids, as well as their aliphatic, cycloaliphatic and aromatic esters, their amides, their nitriles; the allyl, vinyl, vinylidene halides: the alkylvinylethers; and the olefins.

According to the procedure of the invention, one can use all of the organosoluble polymerization initiators capable of being utilized for the preparation in microsuspension of vinyl chloride polymers and represented by the generators of free radicals, such as organic peroxides like lauroyl peroxide, acetylcyclohexanesulfonyl peroxide, isobutyrol peroxide/dichloracetylperoxide, trichloracetylperoxide/; peroxydicarbonates like ethyl peroxydicarbonate, ethyl hexyl peroxydicarbonate, isopropyl peroxydicarbonate, isobutyl peroxydicarbonate; tert.-butyl permethoxyacetate; tert.-butyl perethoxyacetate; tert.-butyl perphenoxy-2-propionate. Each polymerization initiator, generator of free radicals, can be expressed as active oxygen. In the case of a peroxide compound, 1 molecule of said peroxide compound liberates 1 oxygen ion by decomposition; i.e., corresponds to 1 atom of active oxygen. In the case of a polymerization initiator, generator of free radicals other than a peroxide compound, it is accepted to express it as active oxygen by considering likewise that 1 molecule of said polymerization initiator corresponds to 1 atom of active oxygen.

The choice of organosoluble initiator depends on its decomposition rate at the reaction temperature selected. Said initiator must in fact be sufficiently reactive so that by using 0.004 to 0.16% by weight, in relation to the monomer or monomers, of said initiator expressed as active oxygen, the preparation of the latex is realized in times between 4 and 20 hours. However, the decomposition rate must not be too high, so that the quantity of initiation decomposed during the preparation of the latex does not exceed half of the quantity of initiator used. For achieving this, it is thus necessary to select an initiator whose duration of half-life is such that the proposition of initiator destroyed during the preparation of the latex is between 1 and 50% by weight of all of the initiator used.

In case one employs several organosoluble initiators, it is of advantage to select them of different reactivity: the most reactive initiators principally act during the course of preparation of the latex according to the invention, while the least reactive initiators will react principally during the course of polymerization in seeded microsuspension realized from the preparation of vinyl chloride polymers in the presence of said latex used as seeding product.

The most suitable initiator or initiators to be used for each particular homo- or copolymerization and the amount thereof can be determined by routine experimentation.

The quantity of water used according to the procedure of the invention is such that the initial content of monomer or monomers of the reaction medium is generally between about 30 and 50% by weight.

The anionic emulsifying agents used are preferably represented by the soaps of fatty acids, alkyl sulfates, alkyl sulfonates, alkylaryl sulfonates, alkylsulfosuccinates, the alkaline alkyl phosphates and the nonionic emulsifying agents by the polycondensates of ethylene or propylene oxide with various hydroxylated organic compounds. It can be advantageous to likewise add said emulsifying agent or agents to the Reaction medium during the course of polymerization. The quantity of emulsifier is generally between about 0.3 and 4% by weight in relation to the monomer or monomers.

The dispersion of the monomer or monomers in the aqueous medium is formed at a temperature generally between 10° and 30° C. with the help of a mechanical means such as, for instance, a colloid mill, high speed pump, vibrating agitators, ultrasound apparatus, and the like.

The polymerization operation is carried out under autogenic pressure and moderate agitation by raising the dispersion obtained to the aimed-at polymerization temperature ($\theta_1$), generally between about 30° and 65° C., then by adding the 2,6-ditert.-butyl-paza-cresol continuously to the reaction medium when the temperature $\theta_2$ of the reaction medium is such that the temperature difference is above a value selected in the interval going from 0° to +5° C. and preferably from 0° to +2° C. After the usual pressure drop, the reaction is stopped and the unconverted monomer or monomers are removed by degassing.

The invention will be further described in connection with the following examples which are set forth for purposes of illustration only and in which Examples 1, 3, 4, 5, and 6 are given by way of comparison and Example 2 is according to the present invention.

EXAMPLE 1

Comparative

The following are mixed:
(i) 40 kg of vinyl chloride,
(ii) 0.6 kg of lauroyl peroxide,
(iii) 4 kg of an aqueous solution at 10% by weight of sodium dodecylbenzene sulfonate, and
(iv) water in such a quantity that the vinyl chloride content of the mixture amounts to 43 by weight A fine dispersion of the vinyl chloride is formed in the aqueous medium, and then said dispersion is introduced into a double-jacketed autoclave of 120-liter capacity, equipped with an agitator with anchor. The reaction medium thus formed is raised to the desired polymerization temperature ($\theta_1$) of 52° C. under autogenic pressure, the speed of the agitator being 50 RPM.

After the pressure drop; i.e., after 9 hours the vinyl chloride which has not reacted is degasified. A latex is obtained whose dry matter weight content amounts to 40% by weight and whose particles have a mean diameter of 0.4 $\mu$m and contain 1.4% by weight (in relation to the polymer) of lauroyl peroxide.

EXAMPLE 2

The procedure of Example 1 was carried out, but prior to forming the fine dispersion of the vinyl chloride in the aqueous medium, there was added 2,6-ditert.-butyl-para-cresol (DBPC) to said medium and during the course of polymerization there was likewise added 2,6-ditert.-butyl-para-cresol, in continuous manner, to the reaction medium when the temperature of the reaction medium ($\theta_2$) is above 53° C. The DBPC added to the reaction medium during the course of polymerization was used in the form of a dispersion in 2 liters of water.

EXAMPLES 3 AND 4

Comparative

The procedure of Example 2 was carried out, except that the DBPC was replaced with hydroquinone (HQ).

EXAMPLES 5 AND 6

Comparative

The procedure of Example 2 was carried out, except that the DBPC was replaced with methyl hydroquinone (MEHQ).

Table I below indicates for each example:

(i) the nature of the additive (DBPC, HQ or MEHQ) used,
(ii) the quantity of additive added prior to realizing the dispersion,
(iii) the quantity of additive added durinq the course of polymerization,
(iv) the quantity of crusts formed during the formation of the dispersion,
(v) the quantity of crusts formed during polymerization, and
(vi) the maximum temperature difference $\theta_2 - \theta_1$ reached during the course of polymerization.

TABLE I

| | EXAMPLES | | | | | |
|---|---|---|---|---|---|---|
| | 1 | 2 | 3 | 4 | 5 | 6 |
| Nature of Additive | — | DBPC | HQ | HQ | MEHQ | MEHQ |
| Quantity of additive added: | | | | | | |
| (a) prior to forming the dispersion (g) | — | 12 | 12 | 10 | 12 | 12 |
| (b) during the course of polymerization (g) | — | 14 | 12 | 18 | 12 | 14 |
| Quantity of crusts formed: | | | | | | |
| (a) during the formation of the dispersion (g) | 220 | 3 | 205 | 225 | 225 | 205 |
| (b) during the polymerization (kg) | 2.1 | 0.5 | 2.3 | 3.0 | 1.8 | 2.0 |
| Maximum temperature difference $\theta_2 - \theta_1$ (°C.) | +8 | +2 | +8 | +8 | +8 | +7 |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims

What is claimed is:

1. In a process for the preparation of latexes of homo- and co-polymers of vinyl chloride, with particles having a mean diameter between 0.2 and 0.8 μm and containing at least one organosoluble polymerization initiator, by polymerization in microsuspension of the corresponding monomer or monomers, according to which a fine dispersion of the monomer or monomers is formed in an aqueous medium containing at least one anionic emulsifying agent or at least one anionic emulsifying agent and at least one nonionic emulsifying agent, in the presence of 0.004 to 0.16% by weight, in relation to the weight of the monomer or monomers, of said initiator expressed as active oxygen and then the thus formed reaction medium is subjected to polymerization at the desired polymerization temperature ($\theta$hd 1), the improvement comprising adding to the aqueous medium 2.6-ditert.-butyl-para-cresol prior to forming the dispersion of the monomer or monomers and during the course of the polymerization adding 2,6-ditert-butyl-para-cresol, in continuous manner, to the reaction medium, when the temperature of the reaction medium ($\theta_2$) is such that the temperature difference $\theta_2 - \theta_1$ is above a value selected in the interval going from 0° to +5° C.

2. The process of claim 1, wherein the 2,6-ditert.-butyl-para-cresol added to the aqueous medium prior to forming the dispersion of the monomer or monomers represents from about 0.0005 to 0.05% by weight in relation to the monomer or monomers.

3. The process of claim 1 or 2, wherein the amount of 2,6-ditert.-butyl-para-cresol added to the reaction medium during the course of the polymerization is from about 0.0005 to 0.05% by weight in relation to the weight of the monomer or monomers.

4. The process of claim 1, 2 or 3, wherein the 2,6-ditert.-butyl-para-cresol added to the reaction medium during the course of the polymerization is in the form of an aqueous dispersion.

5. The process of claim 4, wherein the 2,6-ditert.-butyl-para-cresol content of said aqueous dispersion is from about to 0.01 to 1% by weight.

6. The process of claim 1, 2 or 3, wherein the 2,6-ditert.-butyl-para-cresol added to the reaction medium during the course of the polymerization is in the form of a solution in a low-molecular-weight aliphatic alcohol.

7. The process of claim 6, wherein said alcohol is selected from methyl alcohol or ethyl alcohol.

8. The process of claim 6 or 7, wherein the 2,6-ditert.-butyl-para-cresol content of said solution is from about 5 to 15% by weight.

9. The process of any one of claims 1 to 8, wherein the initial content of monomer or monomers of the reaction medium is between 30 and 50% by weight and the temperature $\theta_2 - \theta_1$ is above a value selected in the interval from 0° to 2° C.

* * * * *

UNITED STATES PATENT AND TRADEMARK OFFICE
CERTIFICATE OF CORRECTION

PATENT NO.  : 4,868,258
DATED       : September 19, 1989
INVENTOR(S) : BRULET, Daniel It is certified that error appears in the above-identified patent and that said Letters Patent is hereby corrected as shown below:

Column 1, line 9, correct "diameteI" to read -- diameter --, line 33, correct "n" to read -- in --, line 48, after the word "exceed" insert -- 10°C --, line 67, the word "and" should be underlined.

Column 2, line 25, after 5°C and before the period insert -- and preferably from 0° to 2° C --, line 59, should read -- containing at least 50% by weight of vinyl chloride and at --.

Column 4, line 11, delete "2,6-ditert.-paza-cresol" and substitute -- 2,6-ditert.-butyl-para-cresol --, Column 4, line 35, after "43" and before "by" insert -- % --.

Column 6, line 11, delete (Ohd 1) and substitute --($\theta_1$).

Signed and Sealed this

Twenty-first Day of August, 1990

*Attest:*

HARRY F. MANBECK, JR.

*Attesting Officer*  *Commissioner of Patents and Trademarks*